(12) United States Patent
Srikumar

(10) Patent No.: US 12,507,644 B2
(45) Date of Patent: Dec. 30, 2025

(54) VERTICAL GROWTH SYSTEMS INCLUDING SEEDERS, TRIMMERS AND HARVESTERS

(71) Applicant: Arjun Srikumar, Hay River (CA)

(72) Inventor: Arjun Srikumar, Hay River (CA)

(*) Notice: Subject to any disclaimer, the term of this patent is extended or adjusted under 35 U.S.C. 154(b) by 352 days.

(21) Appl. No.: 18/023,673

(22) PCT Filed: Aug. 31, 2021

(86) PCT No.: PCT/CA2021/051208
§ 371 (c)(1),
(2) Date: Feb. 27, 2023

(87) PCT Pub. No.: WO2022/040818
PCT Pub. Date: Mar. 3, 2022

(65) Prior Publication Data
US 2023/0309476 A1    Oct. 5, 2023

(30) Foreign Application Priority Data

Aug. 27, 2020 (CA) ..................................... 3091234

(51) Int. Cl.
*A01G 31/04* (2006.01)
*A01D 93/00* (2009.01)
(Continued)

(52) U.S. Cl.
CPC .......... *A01G 31/045* (2013.01); *A01D 93/00* (2013.01); *A01G 3/033* (2013.01); *A01G 9/0299* (2018.02);
(Continued)

(58) Field of Classification Search
USPC ............................................ 47/82, 83, 62 C
See application file for complete search history.

(56) References Cited

U.S. PATENT DOCUMENTS

| D278,614 S | * | 4/1985 | Moss ........................... D30/127 |
| 5,381,625 A | * | 1/1995 | Wente .................... A01G 9/022 |
| | | | 47/82 |

(Continued)

FOREIGN PATENT DOCUMENTS

| CN | 106818057 | * | 6/2017 | ............. A01D 46/30 |
| CN | 107079801 B | | 11/2019 | |

(Continued)

OTHER PUBLICATIONS

WIPO, Canadian International Searching Authority, International Search Report mailed Nov. 29, 2021, International Patent Application No. PCT/CA2021051208, 5 Pages.

(Continued)

*Primary Examiner* — Andrea M Valenti
(74) *Attorney, Agent, or Firm* — Baumgartner Patent Law; Marc Baumgartner

(57) ABSTRACT

A produce growing and harvesting system is provided for use with at least one motor, the system comprising: a plurality of vertical grow towers, each grow tower defining a bore and including a plurality of apertures extending to the bore from an ambient environment, and a cylindrical upper end; a tower gear at the cylindrical upper end, the tower gear in motive communication with the grow tower; and a grip and rotate system, the grip and rotate system including a body, an external gear for engaging the tower gear, a strut extending between the body and the external gear and in rotational communication with the external gear, a pair of arms attached to the body; a first grip jaw and a second grip jaw defining an opening sized to accept the cylindrical upper end of each grow tower, each grip jaw attached to one of the pair of arms, and including a plurality of rollers disposed in the opening.

14 Claims, 16 Drawing Sheets

(51) Int. Cl.
*A01G 3/033* (2006.01)
*A01G 9/029* (2018.01)
*A01G 9/14* (2006.01)
*A01G 3/02* (2006.01)

(52) U.S. Cl.
CPC ........ *A01G 9/143* (2013.01); *A01G 2003/023* (2013.01)

(56) References Cited

U.S. PATENT DOCUMENTS

| | | | |
|---|---|---|---|
| 6,508,033 B2 | 1/2003 | Hessel | |
| 8,533,993 B2 | 9/2013 | Pettibone | |
| 9,078,404 B2* | 7/2015 | Chung | A01G 31/047 |
| 9,445,554 B2 | 9/2016 | Van De Mortel | |
| 9,693,508 B2* | 7/2017 | Marchildon | A01G 9/02 |
| 10,327,399 B2 | 6/2019 | Elazary | |
| 10,485,171 B1* | 11/2019 | Mekhtiche | A01D 46/22 |
| 2006/0213167 A1* | 9/2006 | Koselka | A01D 75/00 |
| | | | 56/10.2 A |
| 2014/0000162 A1* | 1/2014 | Blank | A01G 31/06 |
| | | | 47/62 A |
| 2016/0120124 A1* | 5/2016 | De Kleine | A01D 46/264 |
| | | | 56/329 |
| 2018/0014471 A1 | 1/2018 | Jensen | |
| 2018/0014486 A1 | 1/2018 | Creechley | |
| 2018/0295800 A1 | 10/2018 | Kiernan | |
| 2018/0352754 A1* | 12/2018 | Brusatore | A01G 9/249 |
| 2019/0133062 A1 | 5/2019 | Joseph | |
| 2019/0307077 A1 | 10/2019 | Lert | |
| 2019/0387677 A1 | 12/2019 | Klein | |
| 2020/0037526 A1 | 2/2020 | Sperry | |
| 2020/0068821 A1 | 3/2020 | Tryon | |
| 2020/0187427 A1 | 6/2020 | Brault | |

FOREIGN PATENT DOCUMENTS

| | | | | |
|---|---|---|---|---|
| CN | 110521435 A | | 12/2019 | |
| KR | 19990068775 A | | 9/1999 | |
| WO | 0115513 A1 | | 3/2001 | |
| WO | 2019246026 A1 | | 12/2019 | |
| WO | WO 2021/144955 | * | 7/2021 | A01D 46/30 |

OTHER PUBLICATIONS

WIPO, Canadian International Searching Authority, Written Opinion of the International Searching Authority mailed Nov. 29, 2021, International Patent Application No. PCT/CA2021051208, 5 Pages.

* cited by examiner

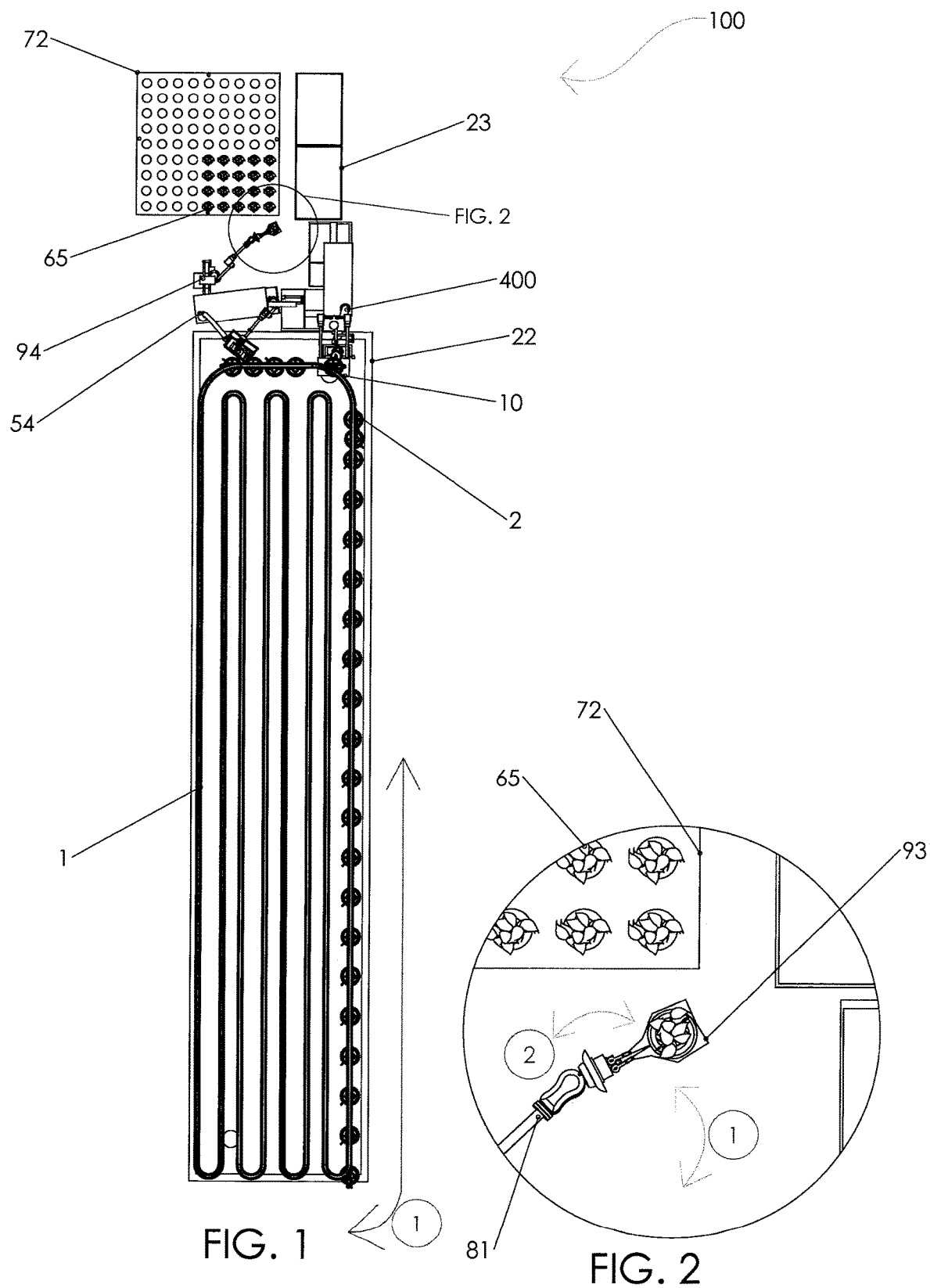

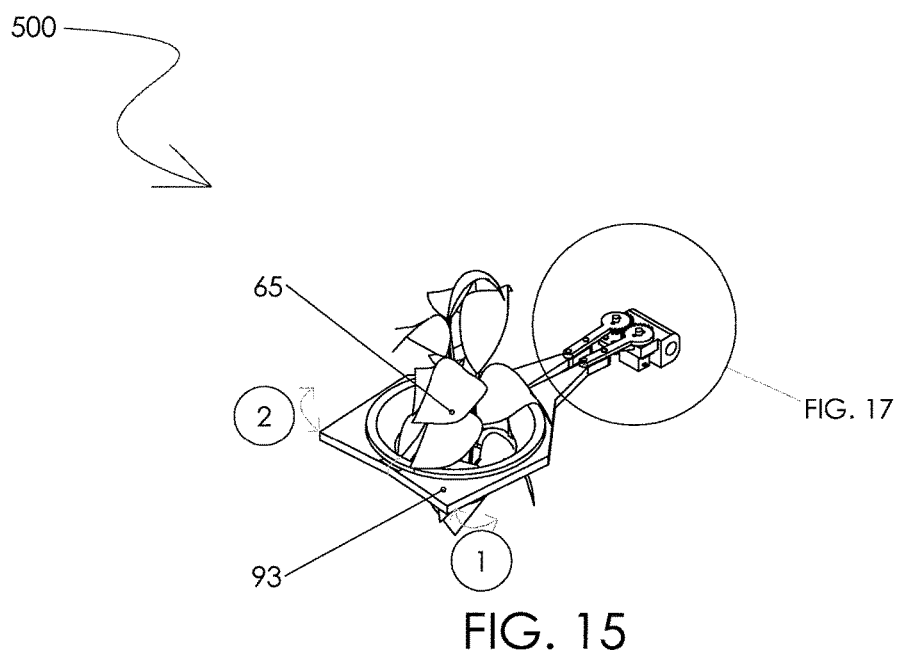
FIG. 15
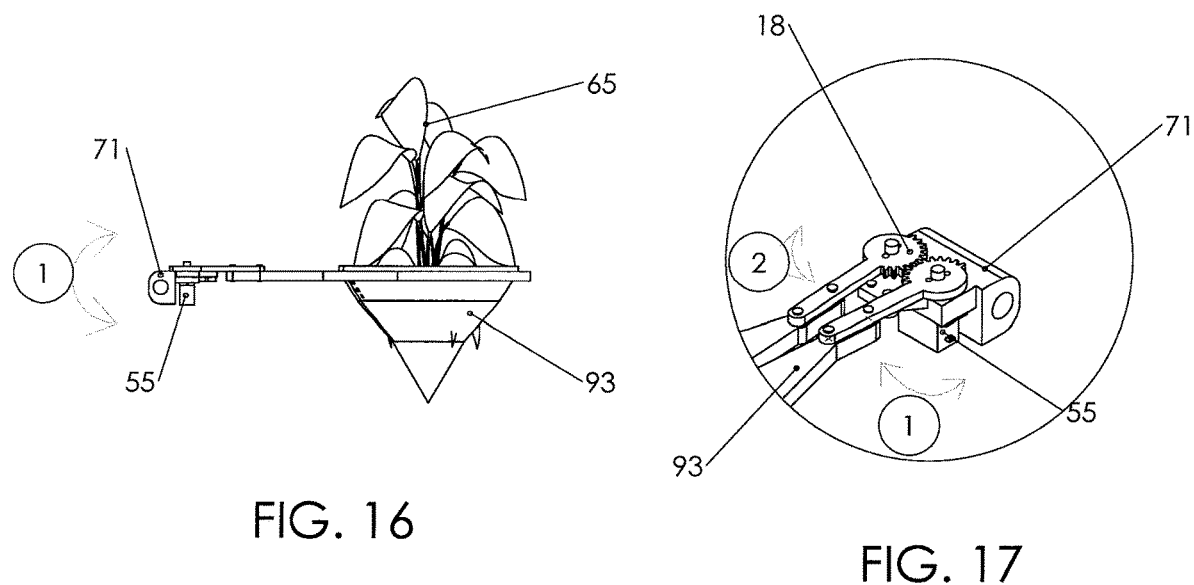
FIG. 16
FIG. 17

VERTICAL GROWTH SYSTEMS INCLUDING SEEDERS, TRIMMERS AND HARVESTERS

CROSS REFERENCE TO RELATED APPLICATIONS

The present invention is filed under 35 U.S.C. § 371 as the U.S. national phase of International Application No. PCT/CA2021/051208, filed 31 Aug. 2021, which designated the U.S. and claims the benefit of Canadian Patent Application Serial No. 3091234, filed on Aug. 27, 2020 and entitled VERTICAL GROWTH SYSTEMS INCLUDING SEEDERS, TRIMMERS AND HARVESTERS, which are hereby incorporated in their entirety including all tables, figures, and claims.

FIELD

The present technology relates to an automated growth system including a mechanical harvester for plants that are grown in vertical growth systems. More specifically, it is a mechanical system that seeds, maintains and harvests produce and transports it to a packaging area.

BACKGROUND

Vertical growth systems have been gaining popularity as they allow for high density growth of plant produce under controlled environments. Numerous designs exist for growing the plants, including columns with planters spaced along the length, vertical walls, and columns with a central groove. The columns with the central groove have been shown to be excellent for the production of leafy greens.

Current harvesting methods include hand harvesting and robotics. Both hand harvesting and robotics require significant space between the rows of columns. Further, hand harvesting increases the potential for disease to be introduced into the growing area.

Current planting methods similarly include hand harvesting and robotics. Again, the seeding methods require significant space between the rows of columns.

United States Patent Application Publication No. 20200187427 discloses a vertical farming system comprising: a plant storage frame including a plurality of horizontal guiding members; a plurality of plant receiving trays received on a corresponding horizontal guiding member for receiving a plurality of plants, the plant receiving trays being disposed adjacent each other and being laterally movable along the horizontal guiding members towards and away from an open front end of the storage frame, the plant receiving trays being connectable to each other such that movement of one of the plant receiving trays in a lateral direction moves the remaining plant receiving trays in the same lateral direction, the plant receiving trays being detachable from each other to allow each plant receiving tray to be removed from the storage frame through the open front end to be tended individually from the other plant receiving trays.

United States Patent Application Publication No. 20200068821 discloses a system for vertical hydroponic plant growing. The system, and associated apparatuses and methods, may include or use sprockets, a sprocket drive device that is connected to at least one sprocket among the sprockets, a first continuous loop chain that is mounted on the sprockets, a second continuous loop chain that is mounted on the sprockets, and trays. Each tray includes a first end and a second end that includes a drain hole. The trays are attached to the first continuous loop chain and to the second continuous loop chain. The system also includes a fluid-dispensing device that is configured to dispense a fluid into a tray that is moved by the chains to a position adjacent to the fluid-dispensing device. The chains are configured to longitudinally tilt a tray downward towards the drain hole while the tray is near the position adjacent to the fluid-dispensing device.

United States Patent Application Publication No. 20200037526 discloses systems and methods for vertical hydroponic growing of plants within an optional enclosure, in particular utilizing liquid nutrigation and/or solid nutrient medium/supplements in combination with vertically configured arrays of interchangeable grow cups to produce near year-round ideal plant growing conditions.

United States Patent Application Publication No. 20190307077 discloses a vertical farming system including a storage structure having racks of storage shelves for housing plant-carrying containers. Mobile robots travel around the racks to transfer containers of plants to and from the storage shelves. Under direction of a central control system, one or more mobile robots may transport a container from a storage location to a workstation. Once there, care may be provided for the plant, including water and/or other nutrients, and data may be gathered on the plant. This may be done by an owner of the plant, or by an automated service robot positioned at the workstation. Data gathered on the plant, including for example photographs, may be sent by email or other communications schemes to an owner of the plant.

United States Patent Application Publication No. 20190387677 discloses a plant harvesting system for use with a vertical hydroponic tower, the hydroponic tower containing a plurality of vertically aligned plants. The harvesting system includes a payload transport system and a harvester. The payload transport system, which is configured to be positioned at a location adjacent to the hydroponic tower, includes a base and a lift tower, the lift tower including a motorized lift system configured to move the harvester upward and downward. In addition to cutting plant stalks while moving upwards along the face of the hydroponic tower, the harvester also groups and collects the plant leaves.

U.S. Pat. No. 6,508,033 discloses a cutting and packaging zone 37 that includes a root removing device 34 which serves for cutting roots from the mature plant and a wrapping device 32 which serves for wrapping the mature plant. Device 34 may employ, for example, a circular saw blade 39 such as a panel sizing saw blade (Leuco). Cut off roots exit housing 6 via a chute 36 below root cutting device 34. After root cutting, harvesting robotic arm 46 transfers the harvested mature plant to device 34 for wrapping. Plant automatic wrapping devices are well known in the art. Wrapped mature plants are either stored in cutting and packaging zone 37 for subsequent collection therefrom by personnel accessing zone 37 through opening 40 or exit housing 6 of system 2 via a dedicated exit chute. A robotic system is used. This requires more space than is necessary. There is no disclosure of a blade that travels the length of a vertical growth column. Further, there is no disclosure of a blade that travels along a battery of vertical growth columns, sequentially harvesting plants in the vertical growth columns.

U.S. Pat. No. 8,533,993 discloses a continuous-loop conveyor, towering upon vertical framework, which allows potted perennial plants and other plants to be transported throughout all stages of maturity in a manner which substantially multiplies yield per acre, allows production to proceed in both natural and artificial light, allows production and harvesting to be automated, and allows production to proceed in conditions which are favorable to plants but unfavorable to humans. The entire apparatus can be constructed of lightweight, cost-effective materials, which afford mass-production and mass-array into vast automatic growing operations.

US Patent Application No. 20190133062 discloses at Paragraph 70 "Referring to FIGS. 19.1, 19.2 and 20.1, a sealing member 228 may be inserted into the recess 213. Sealing member 228 may be provided with a cutout 292 on its end in order to accommodate the plant stalk/trunk. FIGS. 19.1 and 19.2 show inserted and retracted positions, respectively, of the sealing member 228. FIG. 20.1 shows a perspective cutaway of the sealing member 228 fully inserted. According to another aspect of the disclosure, a cutting blade 296, which has a sharpened end for severing the plant stalk, may be inserted into the recess 213 of a chamber to permit removal of a portion of the plant stalk and associated chamber. In this case the cover of the bottom grow chamber is retracted in a chamber to be harvested, i.e., the bottom chamber. Blade 296 travels within the slots formed in the chamber slot sidewalls 222 and severs the plant stalk as detailed in FIGS. 19.3 and 19.4. FIG. 20.2 shows a perspective cutaway of a chamber 200 with a cutting blade fully inserted. FIGS. 19.5 and 19.6 show a second sealing member 298, to be used after a plant stalk is severed." There is no disclosure of a blade that automatically travels the length of a vertical growth column. Further, there is no disclosure of a blade that automatically travels along a battery of vertical growth columns, sequentially harvesting plants in the vertical growth columns.

US Patent Application No. 20180295800 discloses a vertically oriented modular systems and methods for horticulture using stackable, removable containers dimensioned according to the Fibonacci Sequence and configured to hold plants with or without sub-containers with roots wholly or partially submerged in aqueous nutrient solution for aero-hydroponic growth with intake and outtake apertures and at least one conduit to deliver, air, and/or aqueous nutrient solution in fluid communication with other stacked containers, and adjustable baffling to control nutrient solution delivery. The containers are releasably divisible across the face of the container to promote removal, harvest and transplantation without disrupting or damaging plant roots. The containers can also be configured with sensors paired or connected to a computing system to monitor, measure, and store data related to monitoring plant growth. Mounting systems with container center of gravity below the mounting point for stability and automated track-based systems for planting, monitoring, and lighting, and harvesting can also be used. The harvesting may be done with a saw, shears or compressed air mechanism. There is no disclosure of a blade that travels the length of a vertical growth column. Further, there is no disclosure of a blade that travels along a battery of vertical growth columns, sequentially harvesting plants in the vertical growth columns.

US Patent Application No. 20180014486 discloses a computer implemented system for a vertical farming system comprising at least a first crop growth module and operating in an environmentally-controlled growing chamber, the control system comprising sensors for measuring environmental growing conditions in the environmentally-controlled growing chamber over time to generate environmental condition data, a device configured for measuring a crop characteristic of a crop grown in the crop growth module of the environmentally-controlled growing chamber to generate crop growth data and a processing device comprising software modules for receiving the environmental condition data and the crop growth data; applying an algorithm to the environmental condition data and the crop growth data to generate an improved environmental growing condition and generating instructions for adjustment of the environmental growing conditions in or around the growth module in the environmentally-controlled growing chamber to the improved environmental growing condition. A growth circuit is disclosed. There is no disclosure of a blade that travels the length of a vertical growth column. Further, there is no disclosure of a blade that travels along a battery of vertical growth columns, sequentially harvesting plants in the vertical growth columns.

US Patent Application No. 20180014471 discloses a multi-stage, plant growing system is configured for high density growth and crop yields and includes among other things, towers or vertical growth columns, an enclosed controlled environmental growth chamber, interchangeable growth modules, and control systems capable of machine learning wherein the crops are optimally spaced and continually staged in their planting cycles utilizing special growth modules to provide an accelerated and continuous annual production yield. A vertical growth tower for vertical farming comprising a plurality of growth modules, each growth module comprising an enclosure configured to securely hold at least one plant; a drain aperture in the enclosure; and at least one lateral growth opening in the enclosure configured to permit and to encourage lateral growth of the at least one plant away from the enclosure; wherein one or more of the growth modules is configured to stackably support one or more of the other growth modules above and/or below itself within the vertical growth tower. A growth circuit is disclosed. There is no disclosure of a blade that travels the length of a vertical growth column. Further, there is no disclosure of a blade that travels along a battery of vertical growth columns, sequentially harvesting plants in the vertical growth columns.

U.S. Pat. No. 9,445,554 discloses a multi-axis controlled self-climbing tree trimmer used for shaping and severing peripheral growth from a tree is provided herein. The trimmer typically includes a structural segment hinged together to form a rigid chassis that surrounds a tree trunk climbing segment and a trimming portion. The climbing portion is retained within the structural segment in the form of a number of inward-extending carriages containing one or more rollers for gripping the tree trunk during climbing, and the trimming portion may include a rotatable split ring gear containing centrifugally rotating trimming blade members and/or a cutting tool on a positionable arm. When rotated, the blade members unlatch and pivot, into the trunk of the tree to effect controlled trimming. The system may utilize a multi-axis control system that uses linear interpolation, circular interpolation and coordination of all axes to enable the trimmer to follow an XYZ contour selected by a user. This would not be suitable for harvesting plants in a vertical growth system.

U.S. Pat. No. 10,327,399 discloses robots for autonomous harvesting of hydroponically grown organic matter with different harvesters. The autonomous harvesting involves using one or more robots to (1) navigate a hydroponics arrangement or environment to arrive at locations of harvestable organic matter, (2) identify mature organic matter for harvesting from under-ripe or over-ripe organic matter using the robot's sensors, (3) identify the irregular positions and the irregular extraction points at which the mature organic matter is to be correctly harvested using the robot's sensors, (4) harvest the organic matter at the identified positions using the robot harvester, and (5) place the extracted organic matter into a storage bay for delivery to a packaging or shipment station. The harvester includes one or more of a vacuum, a gripper, a cutting saw, or clipping shears disposed about a distal end of an extendable or mechanical arm mounted atop a lift.

What is needed is an autonomous vertical growing system. It would be preferable if it included a mechanical planting system. It would be more preferably if it included a mechanical trimming system. It would be still more preferable if it include a mechanical harvesting system. The harvesting system would preferably include a small, space saving, vertically motive cutter. It would be preferable if the autonomous growing system was configured for use in a climate-controlled facility.

SUMMARY

The present technology is an autonomous vertical growing system. It includes a mechanical planting system, a mechanical trimming system and a mechanical harvesting system. The harvesting system includes a small, space saving, vertically motive cutter. The autonomous growing system is configured for use in a climate-controlled facility.

In one embodiment, a produce growing and harvesting system is provided for use with at least one motor, the system comprising: a plurality of vertical grow towers, each grow tower defining a bore and including a plurality of apertures extending to the bore from an ambient environment, and a cylindrical upper end; a tower gear at the cylindrical upper end, the tower gear in motive communication with the grow tower; and a grip and rotate system, the grip and rotate system including a body, an external gear for engaging the tower gear, a strut extending between the body and the external gear and in rotational communication with the external gear, a pair of arms attached to the body; a first grip jaw and a second grip jaw defining an opening sized to accept the cylindrical upper end of each grow tower, each grip jaw attached to one of the pair of arms, and including a plurality of rollers disposed in the opening.

In the system, the strut may be a telescoping strut or a ram.

In the system, each grow tower may further comprise an axle which is attached to the tower gear and to the grow tower proximate the cylindrical upper end.

In the system, the axle may be attached to the grow tower with a spline which is substantially housed in the bore.

In the system, the arms may be in pivotal relation with the body.

The system may further comprise a carriage mounted on the axle above the tower gear.

In the system, the carriage includes at least one upper wheel and one lower wheel.

The system may further comprise a stand, the body attached to the stand.

The system may further comprise a carry platform on the stand.

In the system, the carry platform may be moveably mounted on the stand.

The system may further comprise a harvester system, the harvester system releasably mounted on the carry platform and including a cutting blade, a harvest case located below the cutting blade, a vacuum pump and a vacuum line in communication with the vacuum pump and that extends from the harvest case to a collection zone.

In the system, the collection zone may be a conveyor.

In the system, the collection zone may be a moveable harvest storage unit.

In another embodiment, an installation is provided for growing and harvesting produce, the installation comprising: a double rail system, which includes a first rail and a second rail, and a rail switch therebetween; at least two vertical members; at least one carriage, the carriage moveably mounted on an upper end of the vertical members and including wheels for engaging the rails; at least one harvester system moveably mounted on the vertical members; a placing unit moveably mounted on the vertical members; a plurality of grow towers located proximate the double rail system, each grow tower including a lower end; a nutrient delivery channel located above the grow towers and suspending the plurality of grow towers; and a produce conveyor adjacent the lower ends of the plurality of grow towers.

In the installation, the placing unit may include a telescoping arm and a pivot.

The installation may further comprise placer pods mounted on one of the vertical members, the placer pods releasably retaining plant bases.

The installation may further comprise a trimmer, which includes an extendable arm which is moveably attached to the vertical member at a first end; a blade which is attached to the extendable arm; and a collector basket in communication with a harvest duct.

In another embodiment, a grip and rotate system is provided for use with a vertical grow tower, the grip and rotate system including a body, an external gear for engaging a tower gear of the vertical grow tower, an arm extending between the body and the external gear and in rotational communication with the external gear, a pair of arms attached to the body; a first grip jaw and a second grip jaw defining a cylindrical opening sized to accept an upper end of the grow tower, each grip jaw attached to one of the pair of arms, and including a plurality of rollers disposed in the opening and a plurality of roller clips linking the grip jaws to the rollers.

FIGURES

FIG. 1 is a top view of the vertical growing system.

FIG. 2 is a close-up view of the mechanical arm that is circled in FIG. 1.

FIG. 15 is a perspective view of the placing unit which is used for both embodiments of the vertical growing system.

FIG. 16 is a side view of the placing unit of FIG. 15.

FIG. 17 is a close-up view of the placing unit that is circled in FIG. 15.

DESCRIPTION

Figure 3:
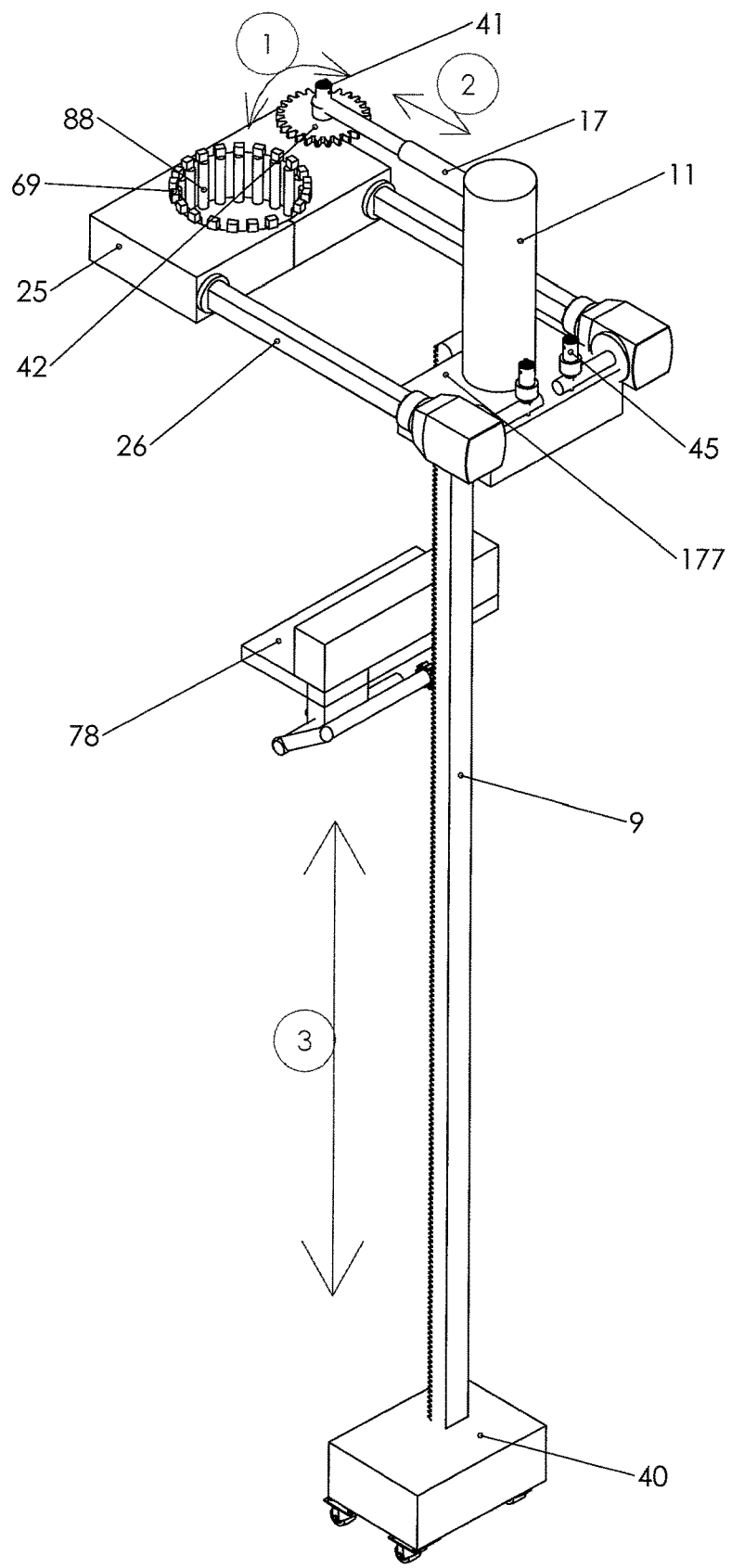
FIG. 3 shows a perspective view of the grip and rotate system.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

An installation for growing and harvesting plants, generally referred to as 100, is shown in FIG. 1. A rail 1 retains and transports grow towers 2. A drain base 22 is under the rail 1 and grow towers 2 for collecting water and nutrients. The harvesting system 400 is located at a first end 10. Adjacent the first end 10 is a packaging and storage unit 23. A germination shelf 72 holds germinated plants that are individually retained in a base 65. It includes a seeder. An extendable trimmer system 54 is located at the first end 10 and is for trimming dead plant material. A vertical mount 94 provides vertical motion and retains the extendable arm 81 that can be seen in FIG. 2.

FIG. 2 shows the extendable arm 81 and a jaw 93 on the end of the extendable arm 81. The jaw 93 opens and closes as indicated by the arrows. When closed, the jaw 93 has a similar shape to that of the base 65, allowing it to pick up germinated seedlings in their base 65 from the germination shelf 72 and to remove senescent plants from the grow towers 2. The extendable arm 81 transports the base 65 back and forth from the germination shelf 72 to the grow towers 2. The base 65 is a plug of roots and plant growth medium and is formed into a shape that is easily grasped by the jaw 93, for example, but not limited to a cone, a frustoconical shape, a cylinder or a ball.

FIG. 3 shows a perspective view of the grip and rotate system, generally referred to as 300. A gear drive motor 41 provides power to an external gear 42, which engages with a tower gear 44 in order to rotate the grow tower 2. An external gear holder 17, which is a strut, extends between a tower 11, which is part of the body 177 and the external gear 42. A jaw arm motor 45 drives a grip jaw 25. A grip jaw arm 26 is located between the jaw arm motor 45 and the grip jaw 25. The grip jaw arm 26 is a pivoting arm. The grip jaw 25 grips the grow tower 2 and allows the grow tower 2 to rotate about its vertical axis. Roller clips 69 link the grip jaw 25 to rollers (See FIG. 4 for the rollers) again to allow for rotation of the grow tower. Also seen in FIG. 3 is a height adjuster 9 which includes a base 40 and adjusts the height of the carry platform 78, hence also adjusting the height of the harvester 400. The height adjuster is a vertical member with an actuator which may be a chain, a belt, a hydraulic ram or a pneumatic ram which is attached to the carry platform 78. It adjusts the height of the harvester system 400, trimmer 54, placing unit 74 (which doubles as an extractor), planter 500.

Direction 1: Shows movement of the external gear that engages with the gear on the grow tower (See FIG. 4).

Direction 2: Shows movement of the external gear holder 17 (telescoping strut ram) back and forth to engage the tower gear 44.

Direction 3: Shows movement of the carry platform 78 up and down.

Figure 4:
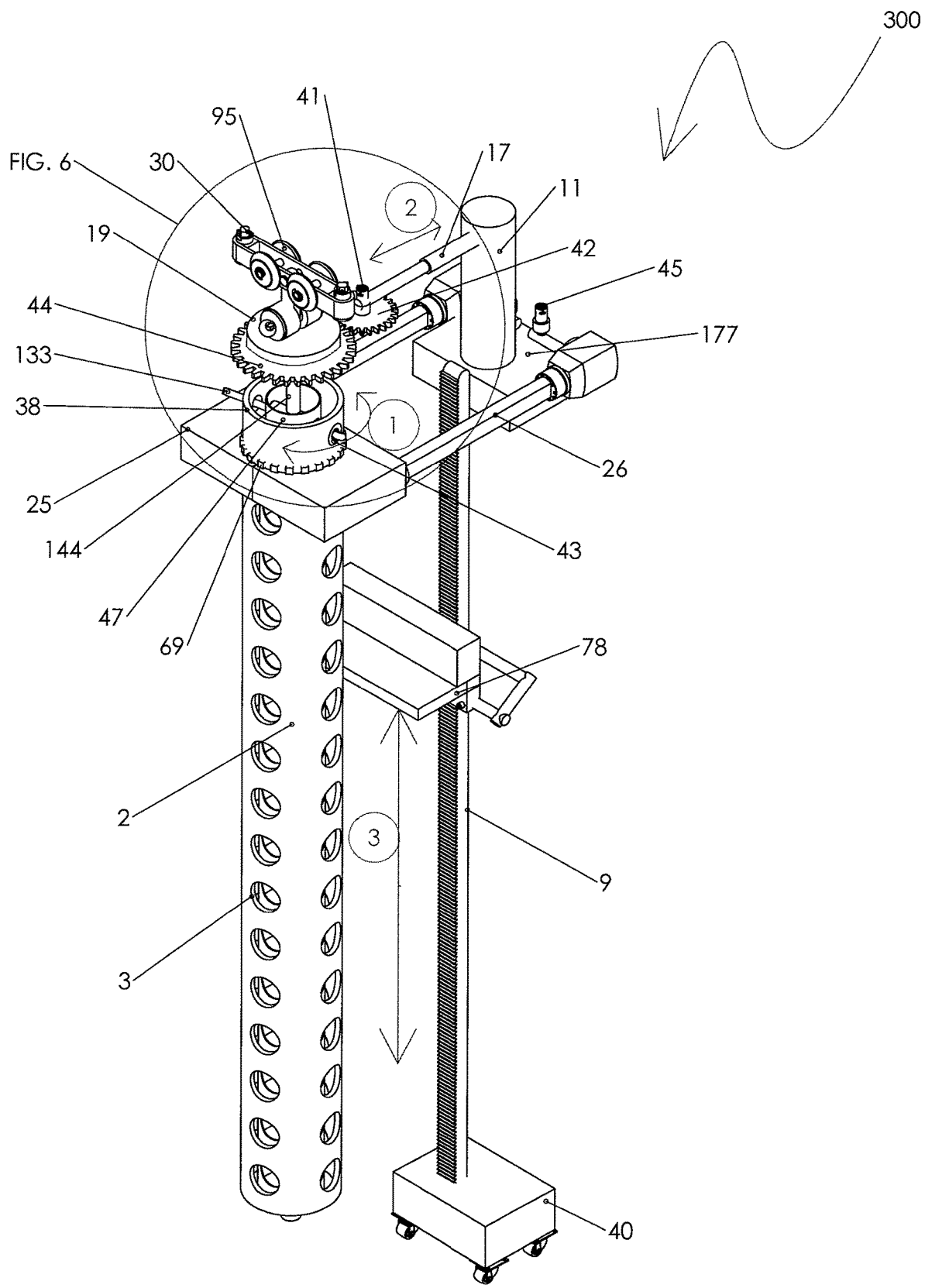
FIG. 4 is a perspective view of the grip and rotate system and a grow tower.

FIG. 4 shows the grip and rotate system 300 and a grow tower 2. The grow tower 2 has a plurality of apertures 3 in which the plant bases 65 are placed. The gear drive motor 41 provides power to the external gear 42, which engages with the tower gear 44 in order to rotate the grow tower 2. A bearing 19 is located above the tower gear 44 and an overhanging link 30 or carriage. The external gear holder 17 extends between the tower 11 and the external gear 42. The jaw arm motor 45 drives a grip jaw 25. The grip jaw arm 26 is located between the jaw arm motor 45 and the grip jaw 25. The grip jaw arm 26 is a pivoting arm. The grip jaw 25 grips the grow tower 2 and allows the grow tower 2 to rotate about its vertical axis. Clips 69 link the grip jaw 25 to rollers 88 (See FIG. 5) for the rollers) again to allow for rotation of the grow tower 2. The grow tower 2 has an axle 144 connected to a spline 133 that extends through the bore 47 and through spline apertures 43 in the grow tower proximate an upper end 38 to urge the grow tower 2 under control of the grip and rotate system 300 to rotate.

Direction 1: Shows clockwise and anti-clockwise motion of grow tower 2, bearing 19 and tower gear 44.

Direction 2: Shows movement of the external gear holder 17 back and forth to engage the tower gear 44 that engages with external gear 42.

Direction 3: Shows vertical movement of carry platform 78.

Figure 5:
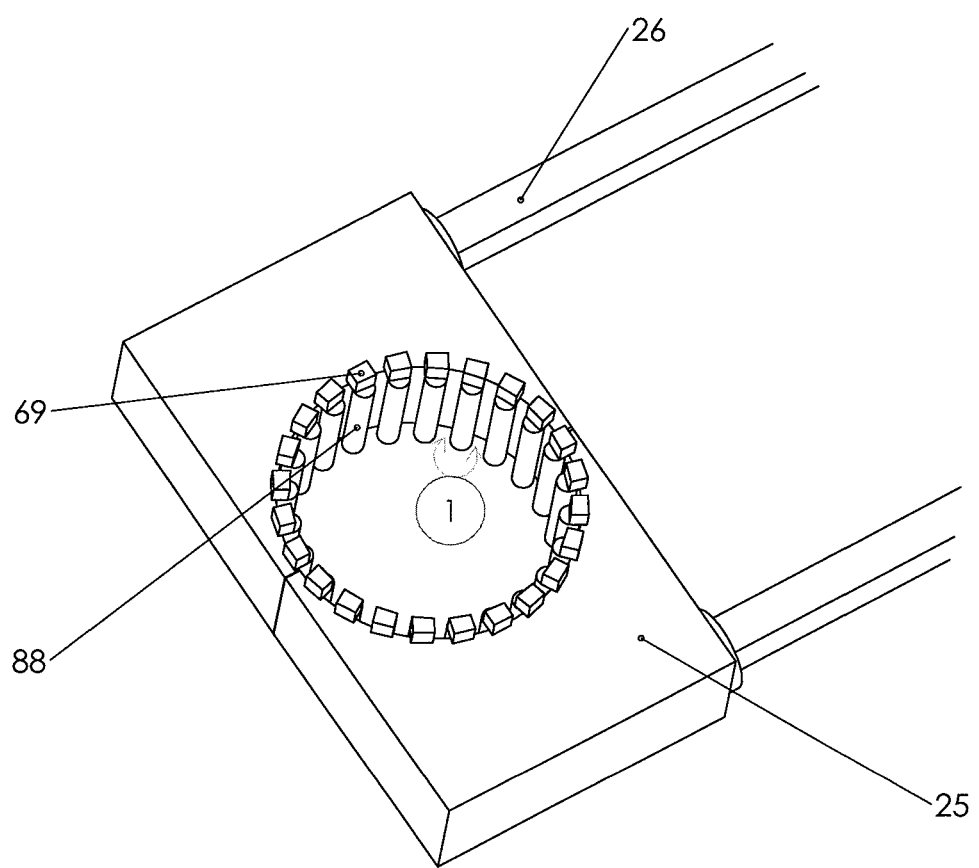
FIG. 5 is a close-up view of the roller clips and rollers of the grip and rotate system of FIG. 3.

FIG. 5 shows the roller clips 69 and the cylindrical rollers 88 on the grip jaw 25. These secure the grow tower 2 during insertion and extraction of the plant base 65, trimming, and harvesting and enable rotation of the grow tower 2 to access plants on other sides of the grow tower.

Direction 1: Shows 360 degree motion of roller clips 88 to enable rotation of grow tower 2.

Figure 6:
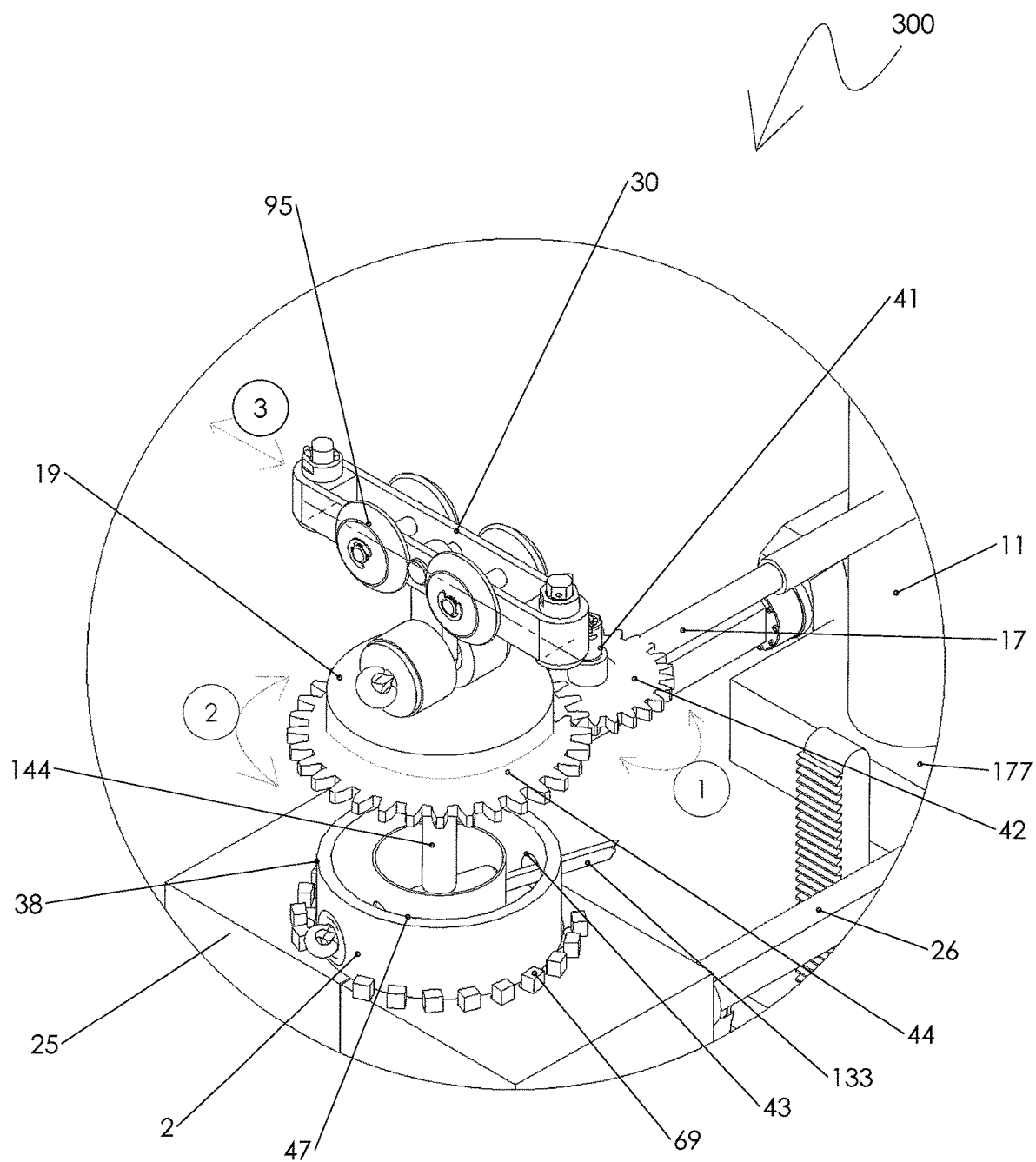
FIG. 6 is a detailed view of the circled components in FIG. 4.

FIG. 6 is a detailed view of the circled components in FIG. 4. The grip and rotate system 300 has an overhanging link 30 which is for rotatably mounted on the rail 1. A bearing link 19 allows the rotational motion of the tower gear 44 and the grow tower 2 independent of the overhanging link 30. The external gear holder 17 retains the external gear 42 on the tower 11 and links power to the external gear 42.

Direction 1: Shows rotational motion of the external gear 42 that engages with tower gear 44

Direction 2: Shows rotational motion of the grow tower 2, bearing 19 and tower gear 44

Direction 3: Shows motion of the grow tower 2 driven along rail 1.

Figure 7:
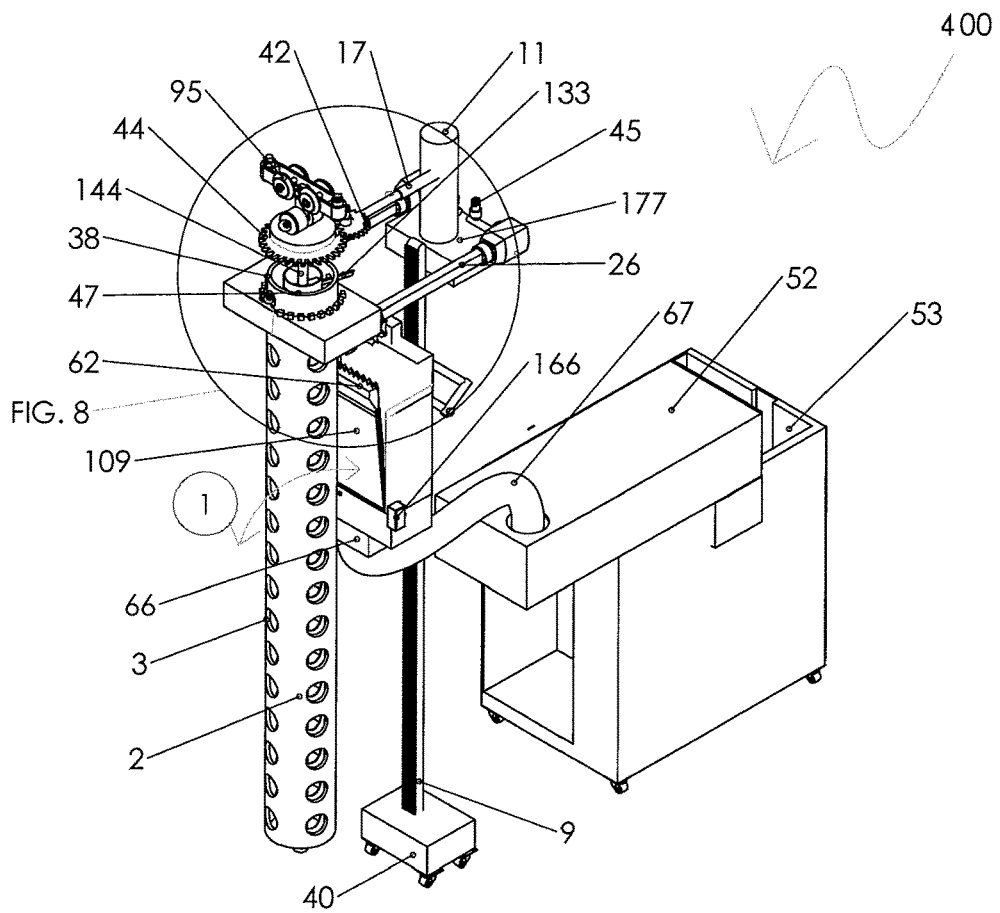
FIG. 7 is a perspective view of the harvesting system of FIG. 1.

FIG. 7 shows the harvester system, generally referred to as 400 with the grip and rotate system 300 and a grow tower 2. A motor 166 is located on the vacuum pump 66. An oscillating straight blade 62 is above a harvest duct 67 which leads into a harvest horizontal duct 52 and which contains a conveyor 109. The conveyor carries harvested produce to a harvest storage unit 53.

Direction 1: Shows pivoting motion of the oscillating straight blade 62 and conveyor 109 driven by motor 166.

Figure 8:
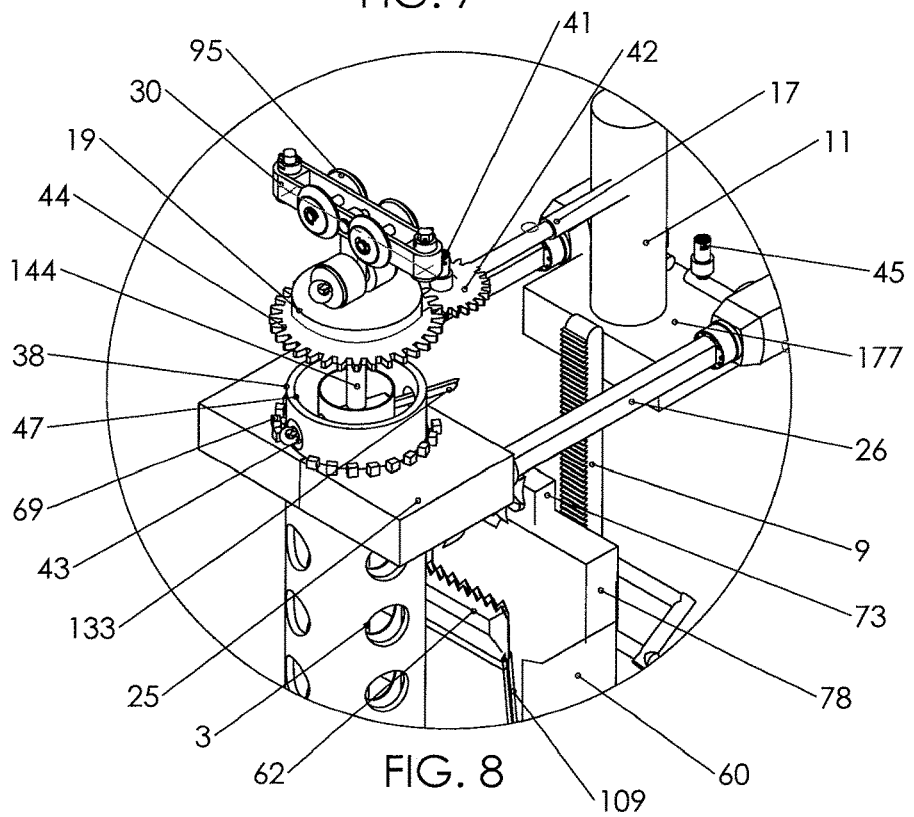
FIG. 8 is a close-up view of the components that are circled in FIG. 7.

As shown in FIG. 8, a camera 73 collects data that is used for the harvester system 400. The oscillating straight blade 62 cuts the plant material to be harvested, which then is suctioned away to a harvest case 60 and then to the harvest duct 67 by the vacuum pump 66. The harvester conveyor 109 is adjacent the blade and urges the plant material towards the harvester case 60. The carry platform 78 retains the harvester system 400.

Figure 9:
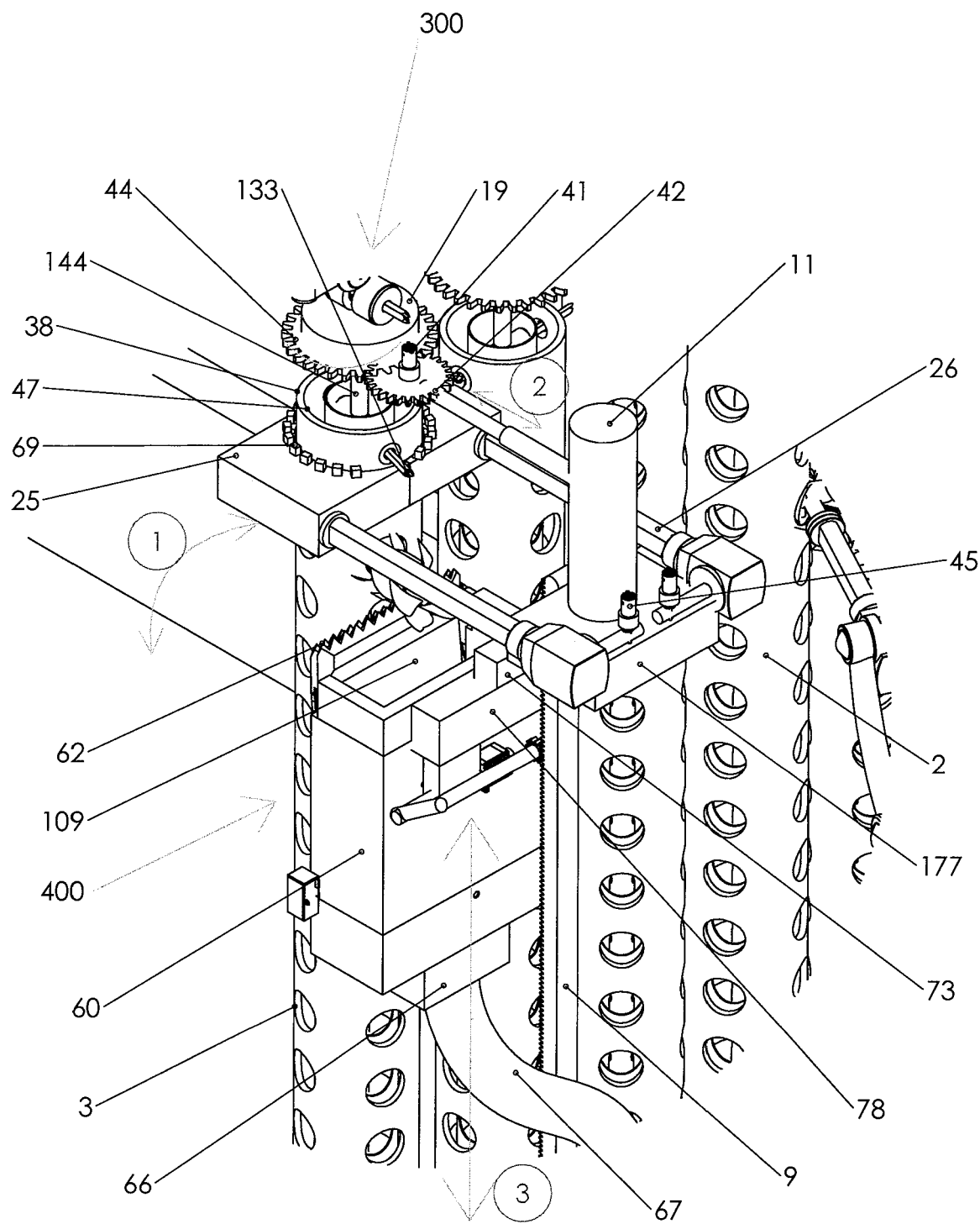
FIG. 9 is a perspective view of the harvesting system of FIG. 1.

FIG. 9 shows the harvesting system, generally referred to as 400, the grip and rotate system 300 and grow towers 2.

Direction 1: Shows the opening and closing of jaws 25 using jaw arm 26 driven by motor 45.

Direction 2: Shows movement of the external gear holder 17 back and forth to engage the tower gear 44 that engages with the external gear 42.

Direction 3: Shows movement of harvester system 400 using carry platform 78 along the height adjuster 9.

Figure 10:
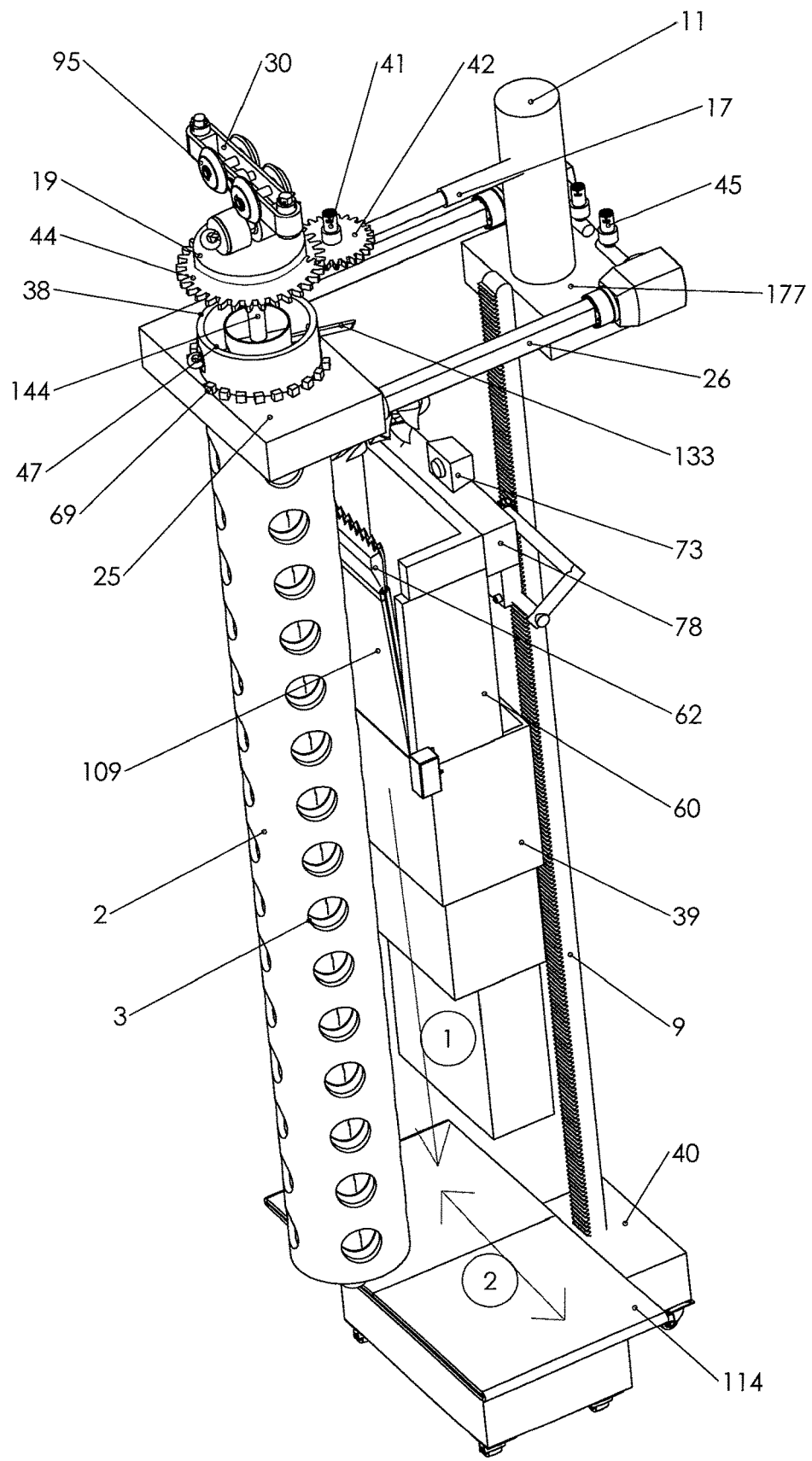
FIG. 10 is a perspective view of an alternative harvesting system of FIG. 1.

FIG. 10 shows a perspective view of alternate harvest system with a flexible/telescopic duct 39 and conveyor 114.

Directions 1 and 2: Show movement of harvested produce down the duct 39 and along the conveyor 114.

In one embodiment, the harvest duct 67 leads into a harvest horizontal duct 52 which contains a conveyor. The conveyor carries harvested produce to a harvest storage unit 53, which is then wheeled to the packaging and storage unit 23. In another embodiment, the cut produce drops onto the produce conveyor 114 and is transported to the packaging and storage unit 23. A height adjuster 9 includes a base 40 and adjusts the height of the carry platform 78, hence also adjusting the height of the oscillating straight blade 62, the harvest duct 67. The height adjuster 9 is a vertical member with an actuator which may be a chain, a belt, a hydraulic ram or a pneumatic ram which is attached to the carry platform 78. The harvester conveyor 109 is adjacent the blade 62 and urges the plant material towards the harvest case 60.

Figure 11:
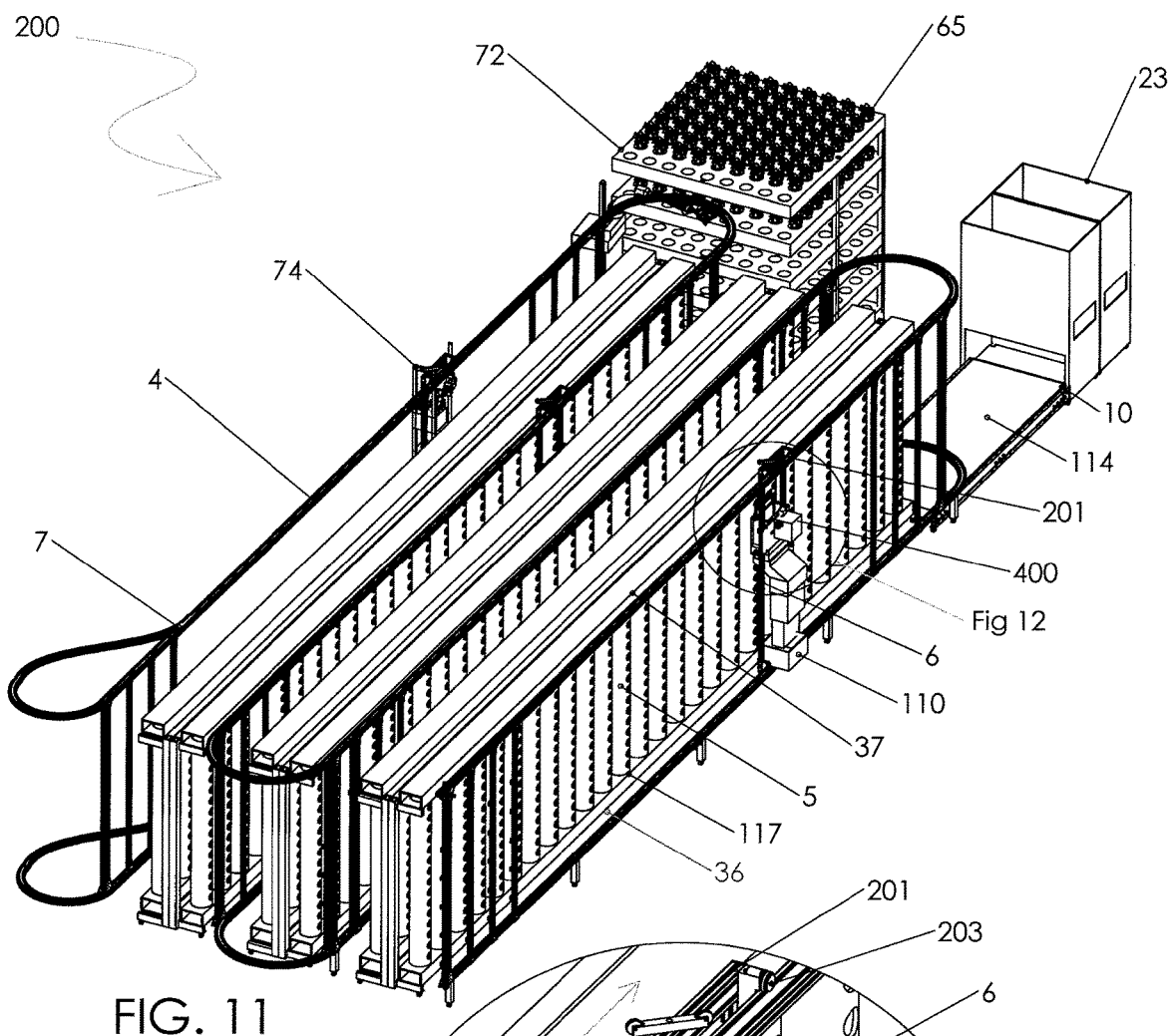
FIG. 11 is a perspective view of an alternative embodiment vertical growing system.

In an alternative embodiment to that of FIG. 1, a double rail system, generally referred to as 200, is shown in FIG. 11. A harvester system 400 and a placing unit 74 are retained and transported on the double rail system 200 by means of vertical members 6 and a carriage 201. The vertical members 6 also provide vertical motion for the harvester system 400 and the placing unit 74. A rail switch 7 allows the harvesting mechanism 400 and the placing unit 74 to move from rail to rail of the double rail system 200. A nutrient drainage channel is below the grow towers 5. A nutrient delivery channel 37 is located above the grow towers 5 and retains the grow towers 5. A collection basket 110 is part of the harvester 400. A produce conveyor 114 transports harvested produce from the harvesting mechanism 400 and is adjacent to the bottom 117 of the grow towers 5 and the collection basket 110. Adjacent the first end 10 is the packaging and storage unit 23. The germination shelf 72 holds germinated plants that are individually retained in a base 65. It includes the seeder.

Figure 12:
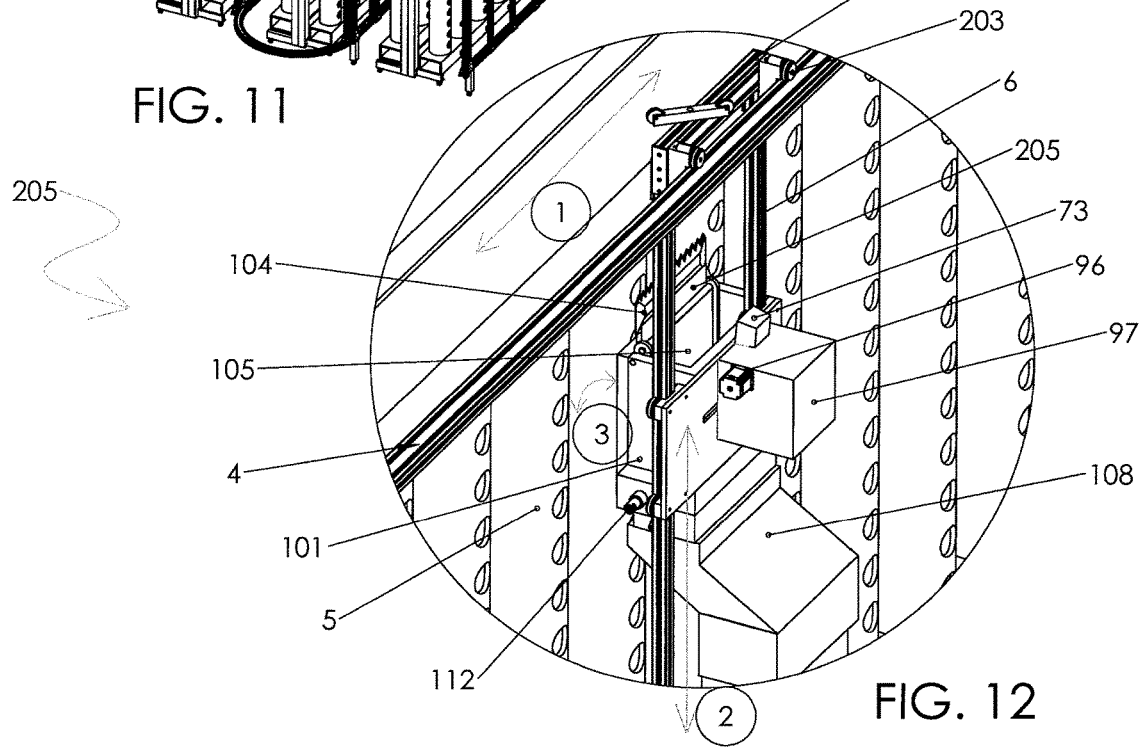
FIG. 12 is a close-up view of the cutter system that is circled in FIG. 11.

FIG. 12 shows a close up of the cutting system, generally referred to as 205 of the second embodiment. The camera 73 is mounted on a control unit case 97, which houses the electrical unit and vacuum pump 66. The harvester case 101 is between the oscillating blade 104 and a telescoping duct 108. The telescoping duct 108 houses a duct conveyor 105 that directs cut produce down the telescoping duct 108. A motor 96 moves the harvester 400 up and down on a pair of vertical members 6. A second motor 112 tilts the duct conveyor 105 and the oscillating blade 104. In this embodiment the grow towers 5 are single sided.

Direction 1: Shows movement of the harvest system 400 along the rail 4 utilizing the wheels 203 and wheels 207 (see FIG. 13 for the wheels on the underside of the carriage) of the carriage 201.

Direction 2: Shows vertical movement of the harvester 400 along vertical members 6.

Direction 3: Shows pivoting motion of the cutting blade 104 powered by the second motor 112.

Figure 13:
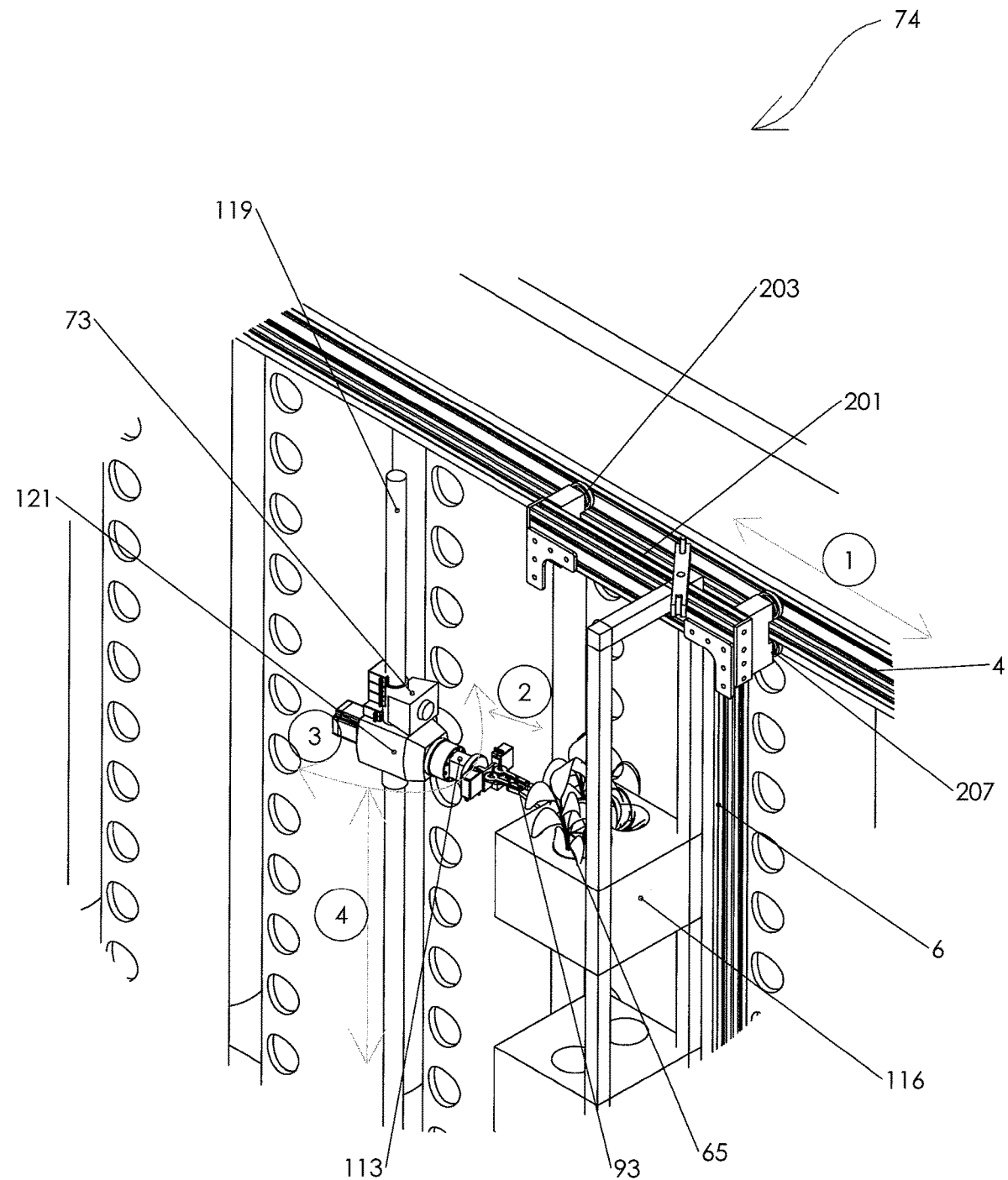
FIG. 13 is a perspective view of the placing unit of the alternative embodiment.

FIG. 13 shows a placing unit, generally referred to as 74. Placer pods 116 are mounted on the vertical members 6 and hold plants in the plant bases 65. The carriage 201 on the vertical members 6 has wheels 203 above and wheels 207 below the rail 4 to allow the placing unit 74 (and the cutting system 205) to move horizontally. A place pole 119 is attached to one of the vertical members 6 and retains place arm 123 in a rotatable and slidable manner. The place arm 123 is an extension arm, which may be a telescoping arm, includes a pivot 113 and retains jaws 93. The jaws 93 open and close. When closed, the jaw 93 is substantially the same shape as the base 65. Each base 65 is picked up from the placer pods 116 and delivered to the grow towers 5. The arrows show the direction of movement.

Direction 1: Shows movement of the placing unit 74 along the rails 4.

Direction 2: Shows linear movement of the place arm 123.

Direction 3: Shows pivoting movement of the place arm 123 around the place pole 119.

Direction 4: Shows vertical motion of the placing unit 74 along vertical member 119.

Figure 14:
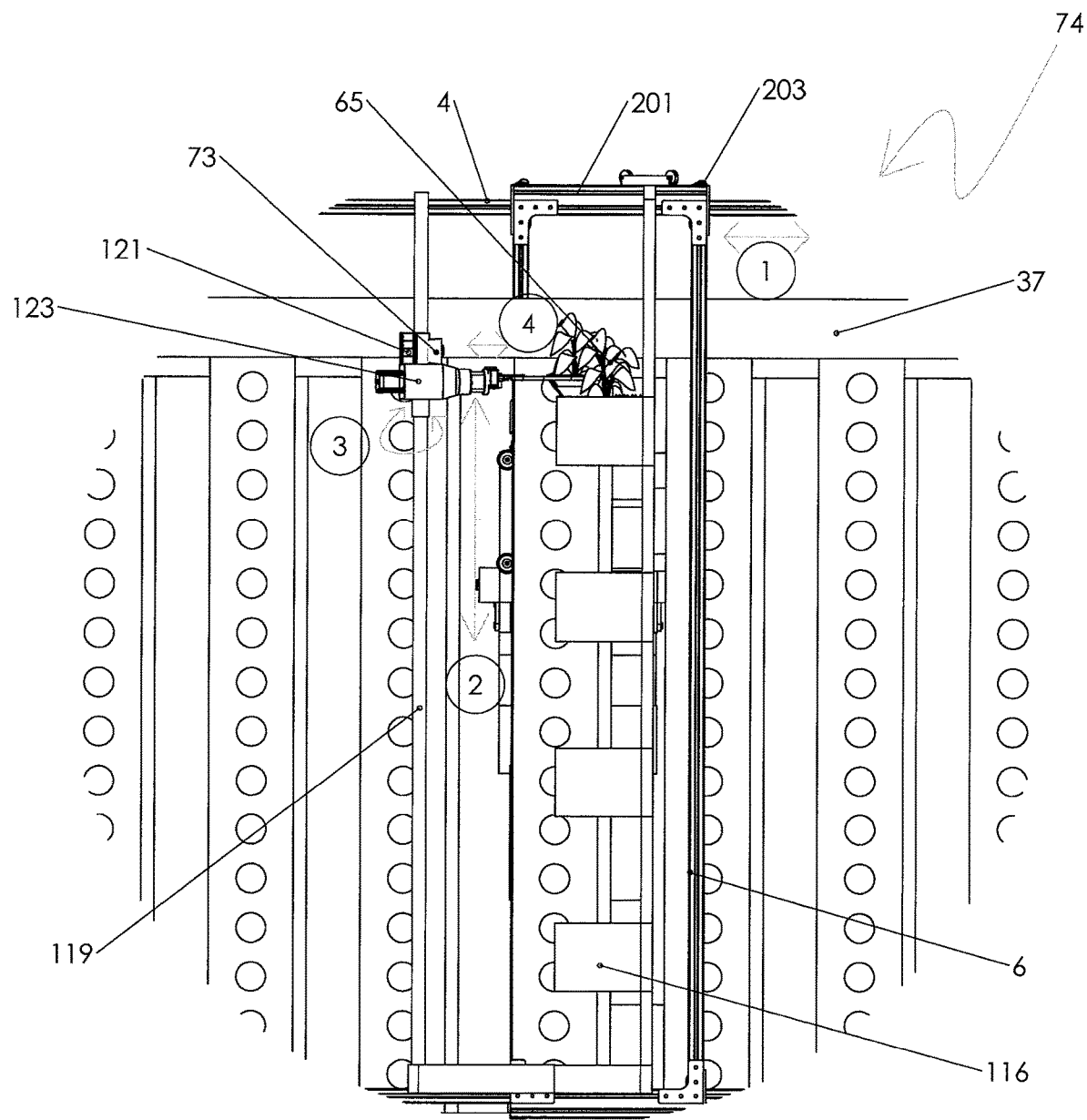
FIG. 14 is a front view of the placing unit of FIG. 13, showing the direction of movement.

FIG. 14 shows movement of the placing unit 74.

Direction 1: Shows movement of the placing unit 74 along the rails 4.

Direction 2: Shows vertical motion of the placing unit along the vertical member 119.

Direction 3: Shows pivoting movement of the placer arm 123 around the vertical member 119.

Direction 4: Shows linear movement of the place arm 123.

FIG. 15 and FIG. 16 show the planter, generally referred to as 500. This is used with both embodiments. The planter picks up and delivers a plant in the base 65 with the jaws 93. The base 65 is conical. The jaws 93 are a corresponding shape, hence they have a sloping mouth with a larger upper cross-sectional area than the lower cross-sectional area and define a round opening. The opening is slightly smaller than the area of the base 65 to ensure a secure grip. The arrows show the direction of movement of the jaws 93. The jaws 93 are driven by a motor 55 and there is a jaw link 71 which links the extendable arm 81 to the jaws 93 and enables the pivot motion. FIG. 17 is a close up of the circled portion of FIG. 15. At one end of the jaws 93 are gears 18 that allow for even motion of the jaws 93 as they are driven by the motor 55. The planter 500 is mounted on a moveable stand.

Directions 1 and 2 in FIGS. 15 and 17: Show opening and closing of the jaws 93 driven by the motor 55.

Direction 1 in FIG. 16: Show pivoting motion at end 71 that is attached to the extendable arm 81.

Figure 18:
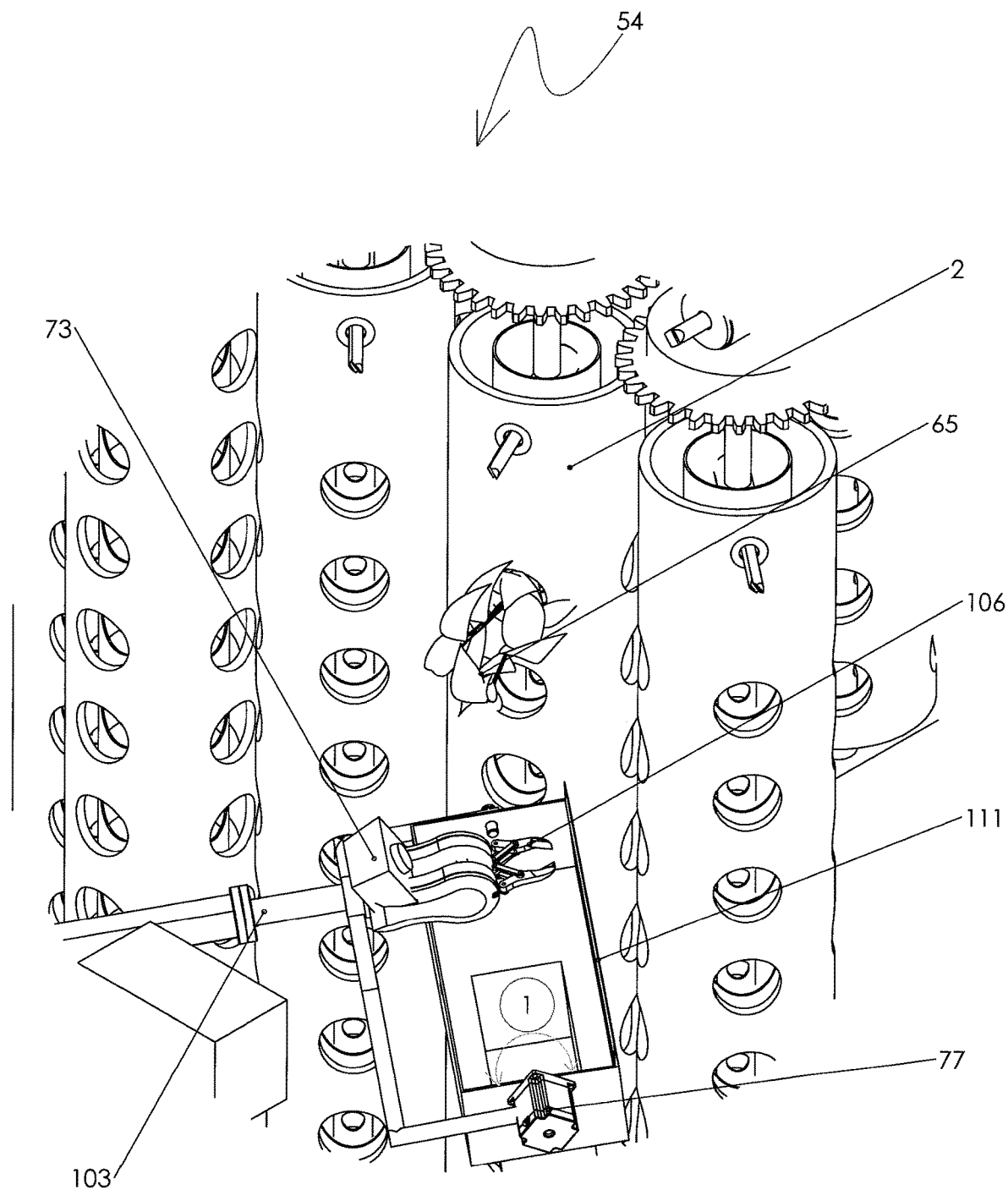
FIG. 18 is a perspective view of the trimmer which is used for both embodiments of the vertical growing system.

FIG. 18 shows the trimmer, generally referred to as 54. This is used with both embodiments. The tower 2 is shown with a plant in the base 65. The extendable arm 103 (which is attached to the vertical mount 94 in the first embodiment and to the vertical members 6 in the second embodiment) retains the collector motor 77 which urges the collector basket 111 to tilt. A snipping blade 106 is at the end of the extendable arm 103. A camera 73 is used to recognize the trimming area. The collector basket 111 is connected to a vacuum tube or telescoping duct.

Direction 1: Shows tilting motion of collector basket 111.

Figure 19:
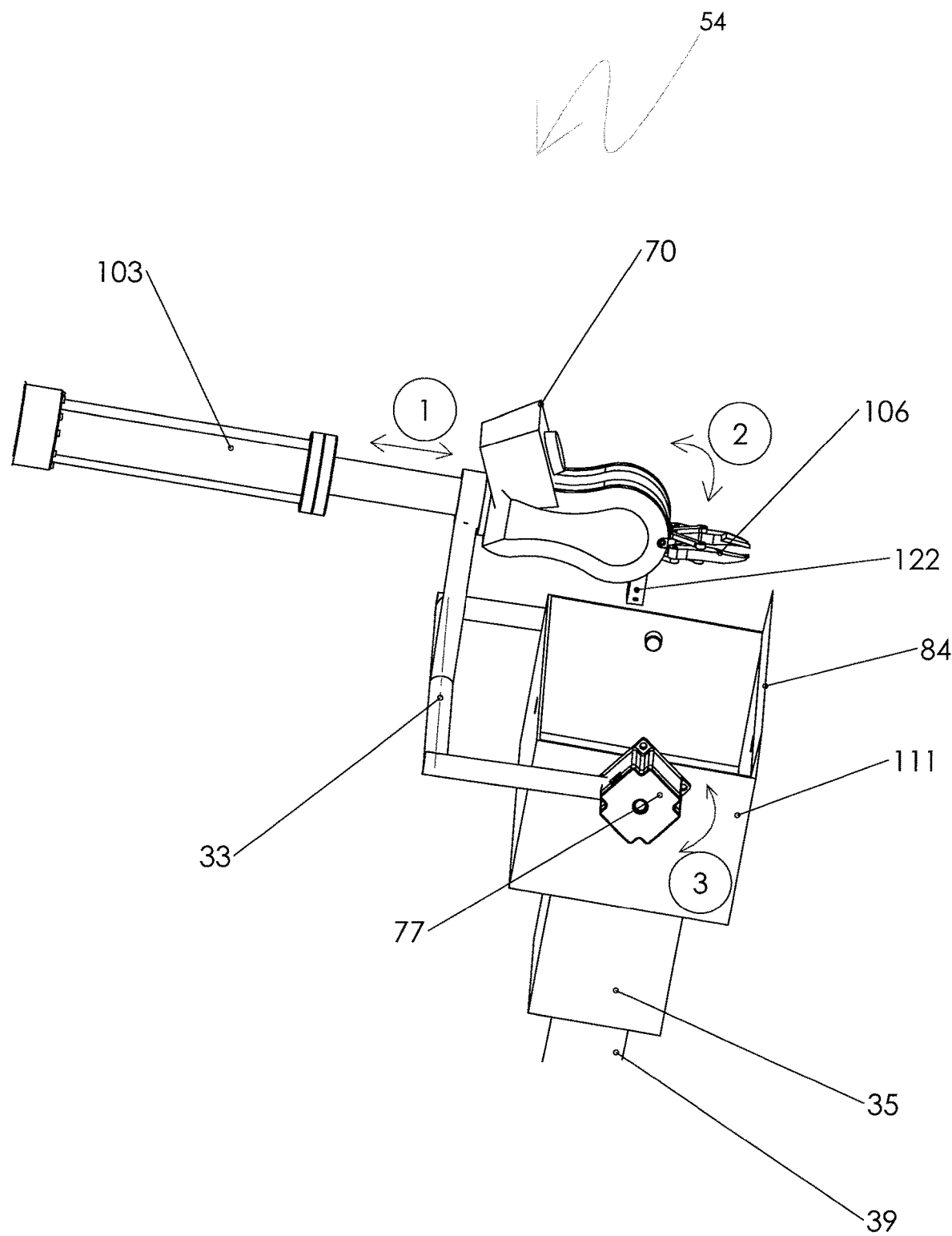
FIG. 19 is a perspective view of the trimmer of FIG. 18.

FIG. 19 shows the trimmer, generally referred to as 54. In addition to the components shown in FIG. 14, a collector rod 33 is shown that connects the collector basket 111 to the extendable arm 103. A collector flip 84 is attached to the top of the collector basket 111 and is made of a flexible material such as a pliable plastic polymer or a brush and assists in directing trimmings into the collector basket 111. The vacuum 35 and duct 39 are aligned with the collector basket 111, when tipped. A motor 122 controls opening and closing of the blades of the snipper 106. The direction of movement is shown with the arrows.

Direction 1: Shows the extendable arm 103 motion to enable trimming.

Direction 2: Shows pivoting motion of the snipping blades 106 at the end of extendable arm 103.

Direction 3: Shows the tilting motion of the collector basket 111.

Figure 20:
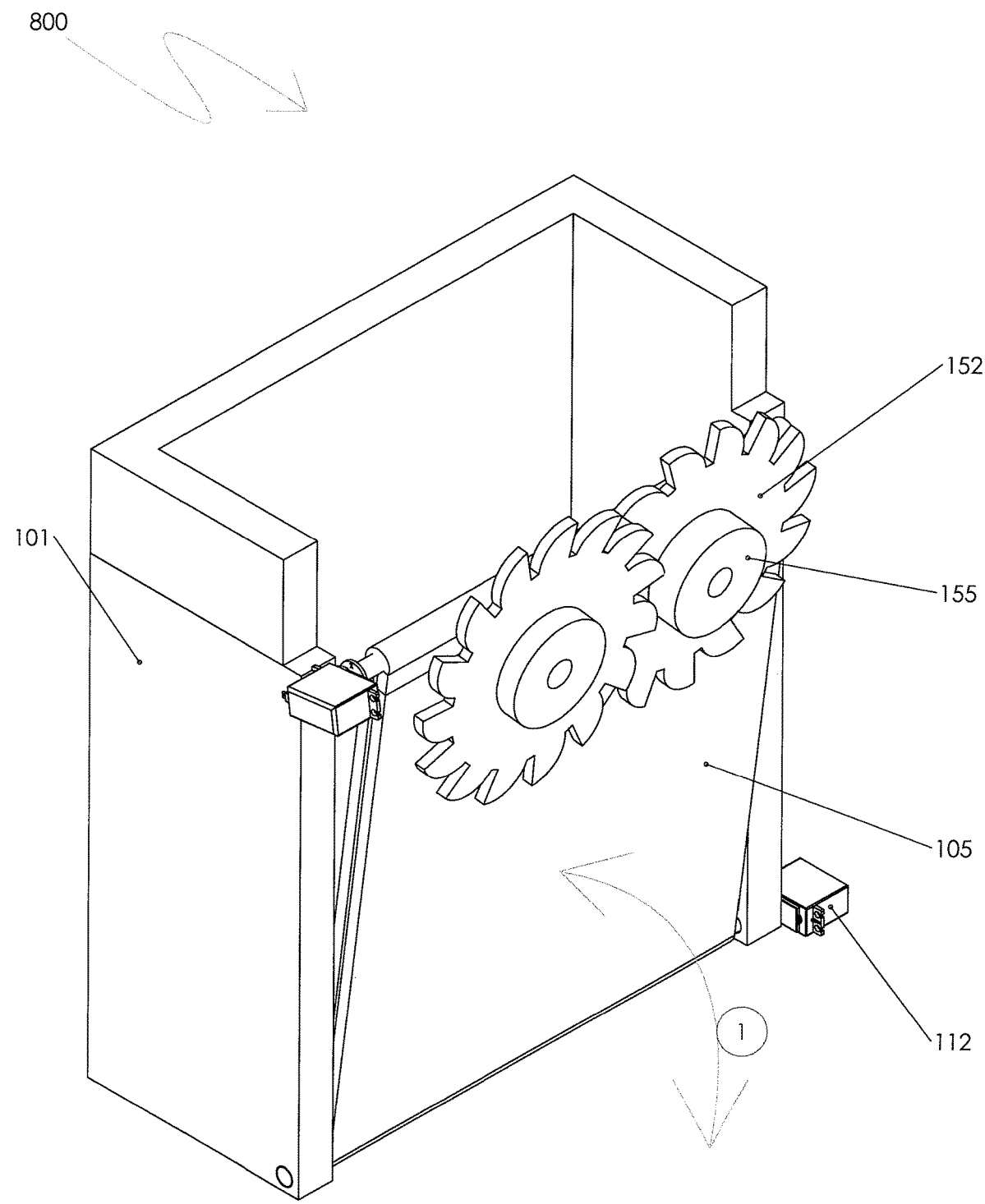
FIG. 20 is a perspective view of an alternative embodiment harvester used for both embodiments of the vertical growing system.

As shown in FIG. 20, an alternative embodiment harvester, generally referred to as 800, is for use with the second embodiment and has a harvester case 101, which includes a door 105 (the arrow indicates the direction of opening of the door 105), a circular harvester blade 152 and a blade motor 155. The door 105 directs harvested produce towards the telescoping duct 105. A motor 112 controls the tilting action and is attached to the side of the harvester case 101.

Direction 1: Shows tilting motion of the blades 152 and conveyor 105 actuated by the motor 112.

Figure 21:
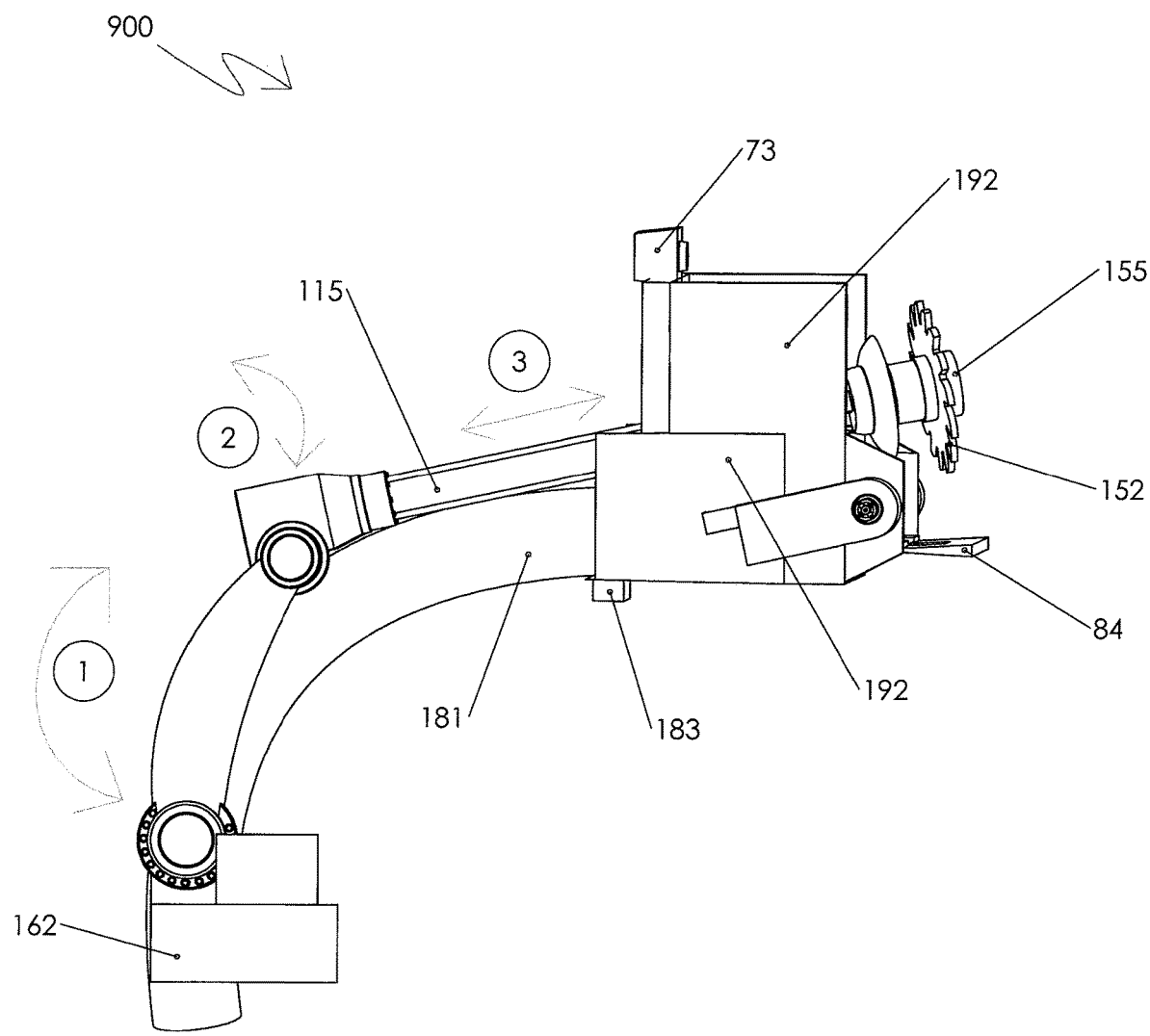
FIG. 21 is a side view of another alternative embodiment harvester used for both embodiments of the vertical growing system.

As shown in FIG. 21, an alternative embodiment harvester, generally referred to as 900, is for use with the first embodiment. A circular blade 152 is driven by a blade motor 155. A harvest case 192 collects the harvested produce and is in communication with a flexible tube 181, which in turn is in communication with a vacuum pump 183. The harvester 900 is mounted on an extendable arm 115 which is pivotally mounted on a base 162. The arrows indicate the direction of movement. The camera 73 is mounted on the top of the harvest case 192. A collector flip 84 is located below the blade 152 to direct the harvested produce.

Direction 1 and 2: Show tilting motion to enable reach of extendable arm 115.

Direction 3: Shows extendable motion of extendable arm 115.

In all embodiments, the harvester system allows for vertical motion along a plurality of plant material with an option to simultaneously in a single motion, harvest multiple plants or utilize the moving conveyor jaw or extendable attached arm to selectively harvest plants.

The motors, vacuum pump, camera, rams and conveyors are in electronic communication with a microprocessor. The microprocessor is configured to control the location of the harvest system, placing unit, trimmer system, the positioning of the grip jaw, the positioning of the grow towers, the positioning of the trimmer, the height of the harvester, the height of the trimmer, the cutting speed of the blade, vertical speed, lateral speed and conveyor speed. The microprocessor is also configured to, based on data from the camera, position the trimmer to remove dead tissue.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein.

The invention claimed is:

1. A produce growing and harvesting system for use with at least one motor, the system comprising: a plurality of vertical grow towers, each grow tower defining a bore and including a plurality of apertures extending to the bore from an ambient environment, and a cylindrical upper end; a tower gear at the cylindrical upper end, the tower gear in motive communication with the grow tower; and a grip and rotate system, the grip and rotate system including a body, an external gear for engaging the tower gear, a strut extending between the body and the external gear and in rotational communication with the external gear, a pair of arms attached to the body; a first grip jaw and a second grip jaw defining an opening sized to accept the cylindrical upper end of each grow tower, each grip jaw attached to one of the pair of arms, and including a plurality of rollers disposed in the opening.

2. The system of claim 1, wherein the strut is a telescoping strut or a ram.

3. The system of claim 2, each grow tower further comprising an axle which is attached to the tower gear and to the grow tower proximate the cylindrical upper end.

4. The system of claim 3, wherein the axle is attached to the grow tower with a spline which is substantially housed in the bore.

5. The system of claim 4, wherein the arms are in pivotal relation with the body.

6. The system of claim 5, further comprising a carriage mounted on the axle above the tower gear.

7. The system of claim 6, wherein the carriage includes at least one upper wheel and one lower wheel.

8. The system of claim 7, further comprising a stand, the body attached to the stand.

9. The system of claim 8, further comprising a carry platform on the stand.

10. The system of claim 9, wherein the carry platform is moveably mounted on the stand.

11. The system of claim 9, further comprising a harvester system, the harvester system releasably mounted on the carry platform and including a cutting blade, a harvest case located below the cutting blade, a vacuum pump and a vacuum line in communication with the vacuum pump and that extends from the harvest case to a collection zone.

12. The system of claim 11 wherein the collection zone is a conveyor.

13. The system of claim 11, wherein the collection zone is a moveable harvest storage unit.

14. A grip and rotate system for use with a vertical grow tower, the grip and rotate system including a body, an external gear for engaging a tower gear of the vertical grow tower, an arm extending between the body and the external gear and in rotational communication with the external gear, a pair of arms attached to the body; a first grip jaw and a second grip jaw defining a cylindrical opening sized to accept an upper end of the grow tower, each grip jaw attached to one of the pair of arms, and including a plurality of rollers disposed in the opening and a plurality of roller clips linking the grip jaws to the rollers.

* * * * *